Dec. 3, 1929.   G. I. WORLEY   1,738,490
MOTOR VEHICLE TRUCK
Filed Jan. 4, 1927   4 Sheets-Sheet 1

INVENTOR.
GEORGE I. WORLEY.
by Ely & Barrow
ATTORNEYS.

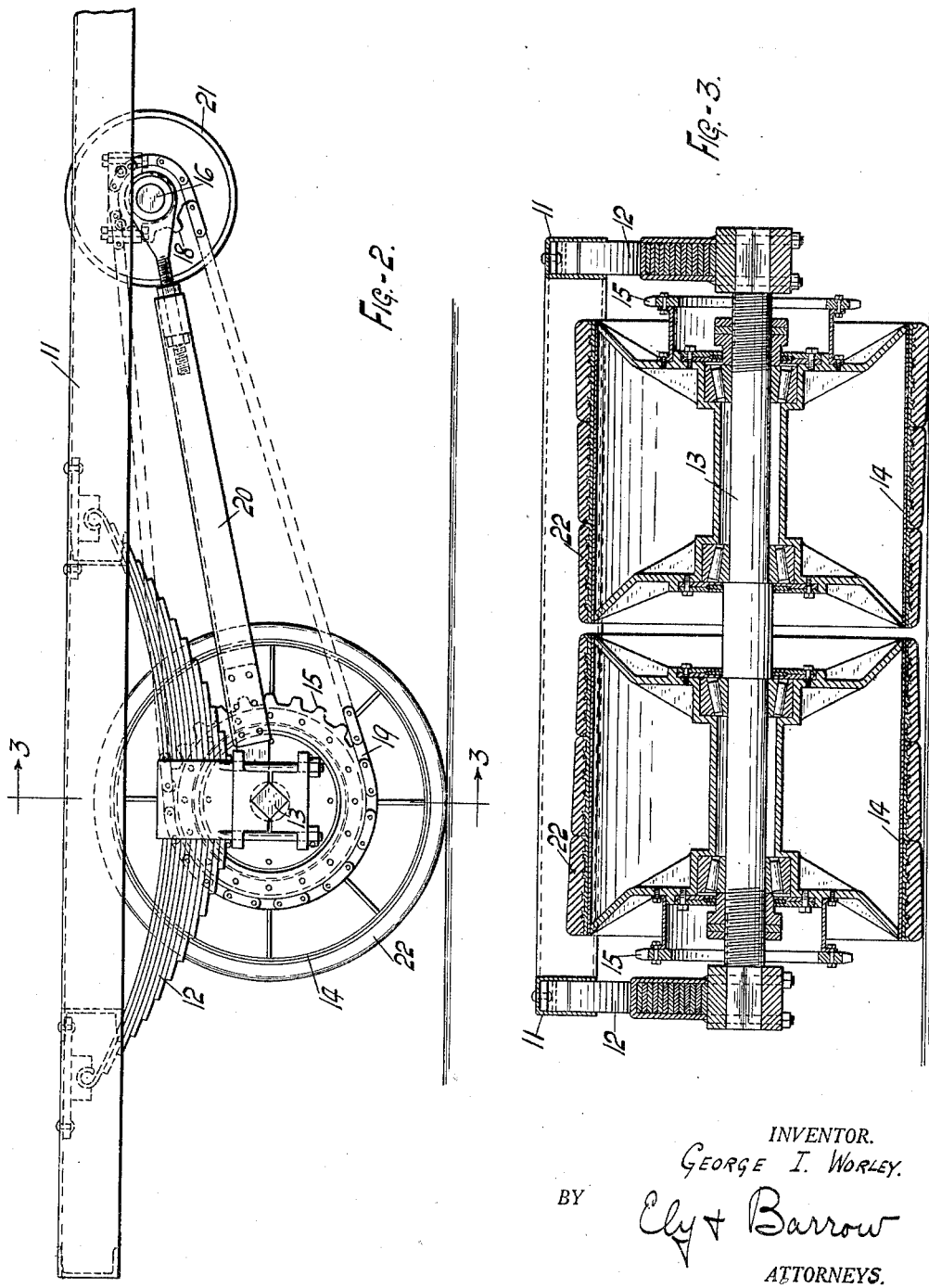

Dec. 3, 1929.                G. I. WORLEY                1,738,490
                            MOTOR VEHICLE TRUCK
                            Filed Jan. 4, 1927            4 Sheets-Sheet 3

INVENTOR.
GEORGE I. WORLEY.
BY Ely & Barrow
ATTORNEYS

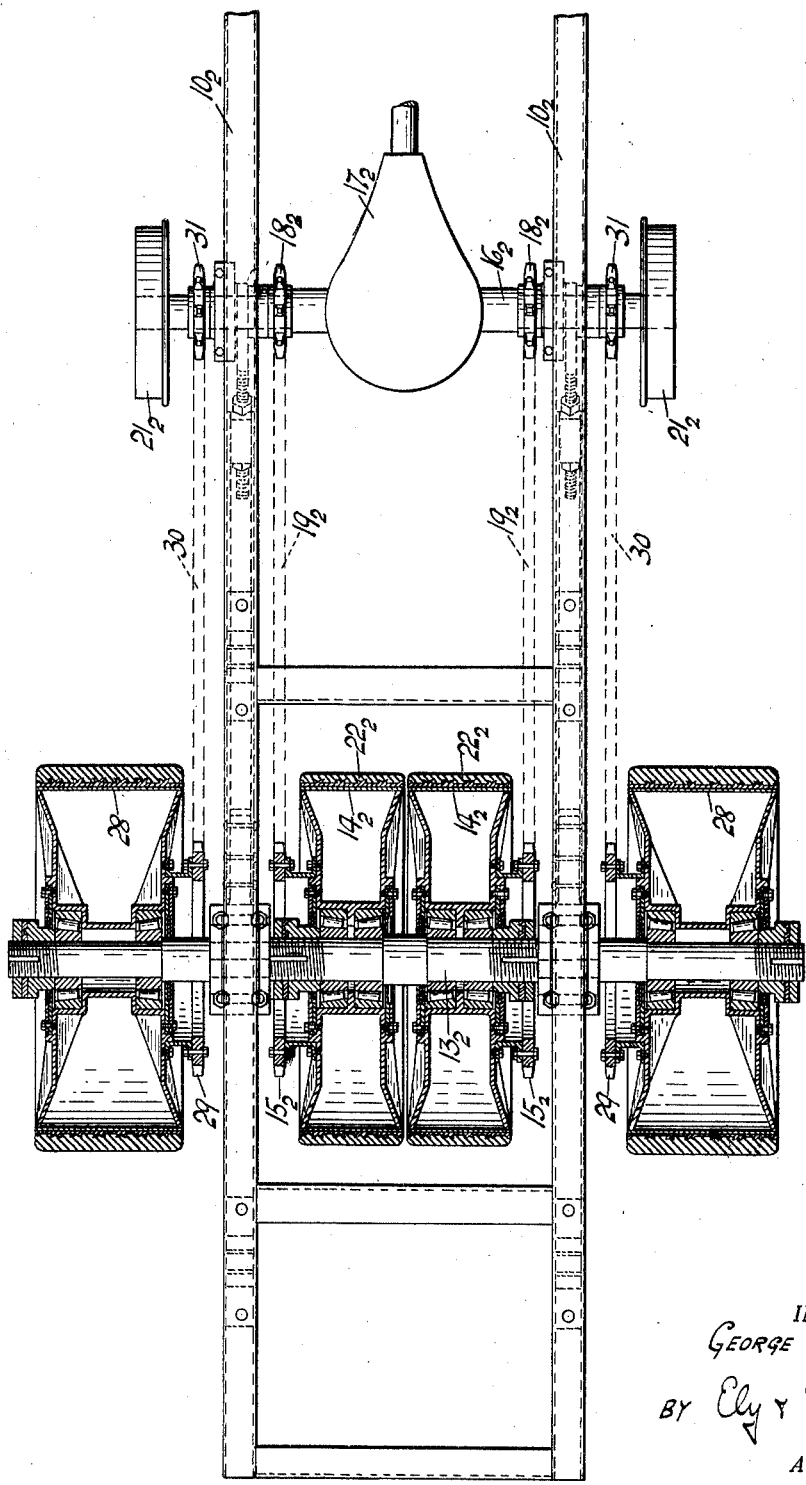

Patented Dec. 3, 1929

1,738,490

UNITED STATES PATENT OFFICE

GEORGE I. WORLEY, OF AKRON, OHIO; MYRTLE A. WORLEY ADMINISTRATRIX OF SAID GEORGE I. WORLEY, DECEASED

MOTOR VEHICLE TRUCK

Application filed January 4, 1927. Serial No. 158,905.

This invention relates to trucks such as are used for hauling road building materials.

The general purpose of the invention is to provide a truck capable of effective use in road building and for other purposes whereby the truck is adapted for normal operation over improved roads and also over soft grades without rutting or tearing up the latter.

Particularly it is an object of the invention to provide traction wheels for a truck which are, in effect, rollers whereby, in hauling road materials, the weight of the materials hauled plus the weight of the truck serve to compact the subgrade or surfacing materials previously laid.

The foregoing and other objects are obtained by the combined trucks and rollers illustrated in the accompanying drawings and described below. It is to be understood that the invention is not limited to the specific forms thereof shown and described.

Of the accompanying drawings,

Figure 2 is a side elevation thereof;

Figure 3 is a section on line 3—3 of Figure 2;

Figure 6 is a plan, partly in section, of a third form of truck embodying the invention.

Figure 1:
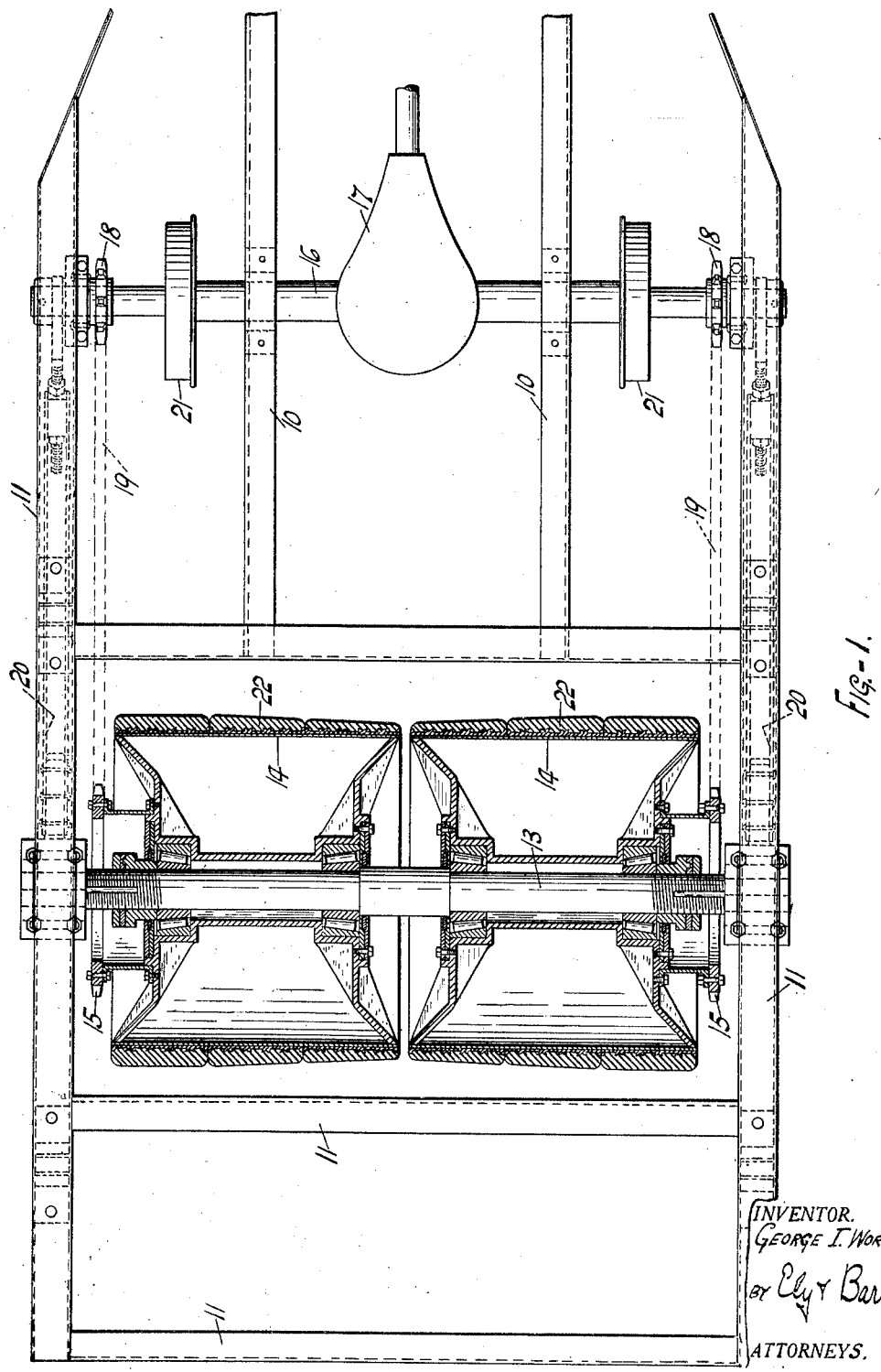
Figure 1 is a plan, partly in section, of the rear portion of a truck chassis embodying the invention.

In the form of the invention shown in Figures 1 to 3, 10 represents a standard truck frame to which has been secured an auxiliary frame 11. On frame 11 springs 12, 12 are secured for supporting the rear of the truck on an axle 13. Journaled on axle 13 within the outline of the frame 11 are drums 14, 14 each having a sprocket 15 secured to the outer end thereof and arranged to be differentially driven from a differential shaft 16 journaled on the main frame 10 and driven from the truck motor (not shown) through a differential 17, differential shaft 16 having sprockets 18 thereon over which are trained chains 19 arranged to drive the sprockets 15. To transmit the impelling forces of the drums 14 to the chassis of the truck, torque arms 20 are extended from axle 13 to axle 16. Braking may be accomplished on brake drums 21 arranged on axle 16.

Drums 14 provide substantially a continuous bearing surface and traction across the entire width of frame 11, sufficient clearance being provided at the center for differential action and at the sides clearance is provided for sprockets 15. Preferably a number of solid rubber tires 22 are mounted on drums 14, of which the tires at the outer ends of the drums 14 may be of greater diameter than those adjacent the center ends thereof so that the truck can be effectively driven over crowned roads without lateral rocking and also so that there will only be contact of the two outer tires with a hard road. Whether the tires are originally of different diameters as shown or are of uniform diameters is immaterial since the latter will soon wear to correspond to the crown of the road in which case the tires will assume the varying diameters as illustrated.

Figure 4:
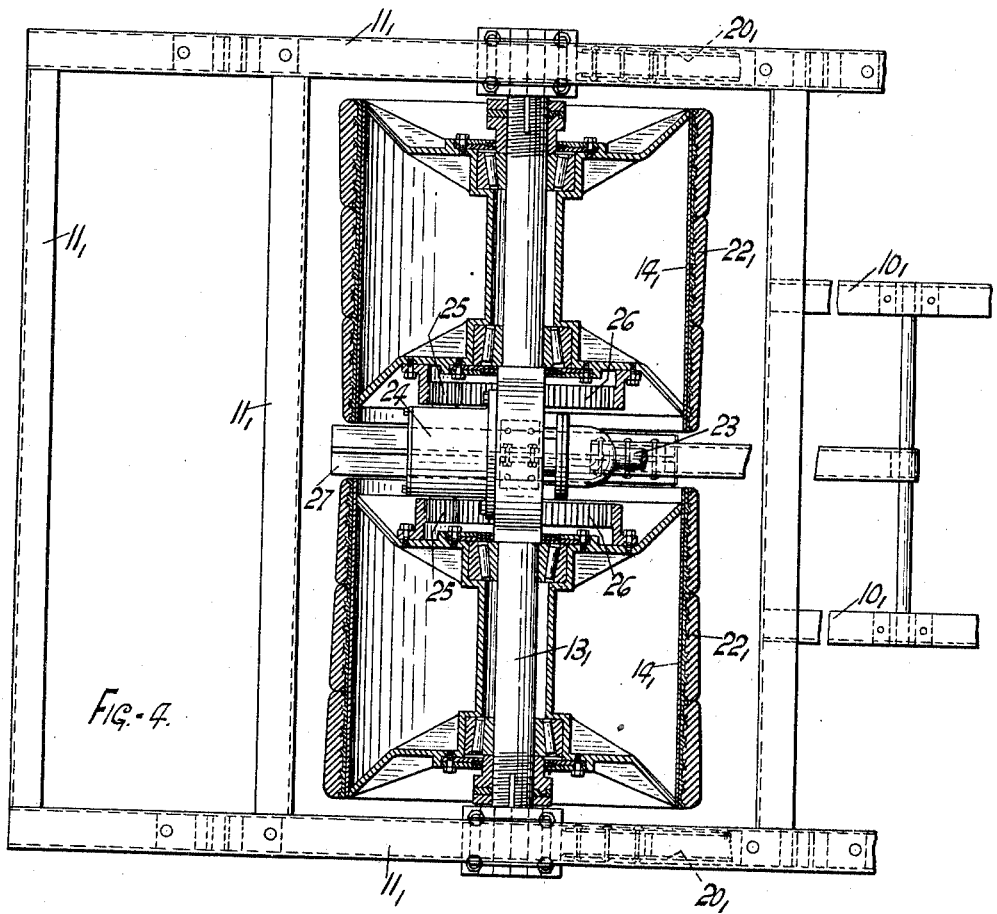
Figure 4 is a plan, partly in section, of another form of truck embodying the invention.
Figure 5:
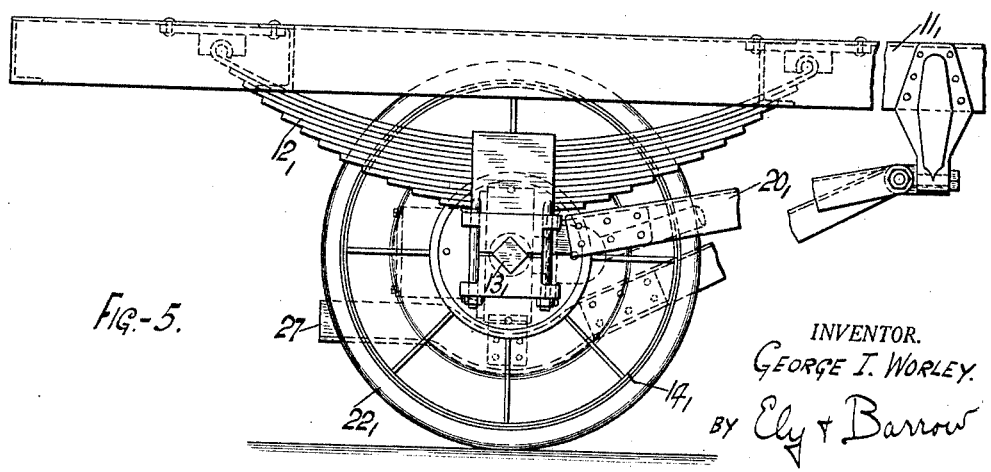
Figure 5 is a side elevation thereof.

In the form of the invention shown in Figures 4 and 5, in which parts similar to those in Figures 1 to 3 are designated by the same numeral with the sub-numeral 1, an internal gear type differential drive for drums $14_1$ is substituted for the chain drive shown in Figures 1 to 3. The motor driven drive shaft 23 drives the internal gear differential 24 mounted on the axle between the drums, the inner faces of which are of generally concave formation to accommodate the differential. Pinions 25 of the differential mechanism are meshed with the internal gears 26 secured to the inner ends of drums $14_1$. Since the clearance between drums $14_1$ must be somewhat greater with this type of drive, a guard 27 is arranged to prevent stones or other objects working up between drums $14_1$ so as to bind the driving mechanism. In this construction, torque arms $20_1$ are extended from axle $13_1$ forwardly and upwardly to frame $11_1$. Suitable brakes (not shown) may be employed.

In Figure 6 the invention is adapted to a standard truck frame without the use of an auxiliary frame, the usual driving wheels of the standard truck being retained. In this figure, parts similar to those of Figures 1 to 3 are numbered similarly, the number being followed by the sub-numeral 2.

The standard driving wheels are shown at 28, being driven by sprockets 29, chains 30 and sprockets 31 on axle $16_2$. Drums $14_2$ are driven by sprockets $15_2$, chains $19_2$ and sprockets $18_2$ on differential shaft $16_2$. Tires $22_2$ are of less diameter than the tires on the standard wheels 28. Braking may be effected on drums $21_2$ on shaft $16_2$.

In the normal operation of this type of truck over hard roads, the equivalent of the standard two-wheel traction may be provided on the rear end of the truck since the central tires ordinarily do not contact with the road. In operation over soft boggy earth, the tires more adjacent the center of the rear end of the truck come into play, thereby preventing the formation of ruts or the tearing up of soft grades.

In building surfaced roads with the use of the trucks of the type disclosed herein, the laying of the road materials preferably progresses from the previously finished hard road as the starting point from which the trucks are driven, the trucks not rutting these grades and in fact acting as rollers on which the weight of the truck plus the weight of the materials hauled thereby is utilized preliminarily to compact loose road material previously laid.

In building concrete roads where previously constructed road requires considerable setting time, the trucks are driven in over the soft sub-grade. In the past this has necessitated much refilling and re-rolling of ruts to avoid waste of concrete in filling the same. With trucks of the type disclosed herein, however, the hauling of the materials over the soft sub-grade does not rut and even serves to compact the same and thus to improve rather than to cut up the soft sub-grade.

When making a cut and fill in grading roads, the trucks of the invention are useful in compacting the fill as it is being made. For example, they may be backed from the excavator in the cut over the materials dumped thereby into the fill.

In addition to the combined rolling and hauling functions of the truck, the roller type rear wheels serve to provide increased traction for trucks in general hauling use when soft, muddy roads are encountered.

Modifications of the invention other than those disclosed herein may be resorted to without departing from the spirit thereof or the scope of the appended claims.

What is claimed is:

1. A combined truck and roller including a truck frame, and a wheel mount for the rear of said frame comprising an axle, springs on the axle supporting the frame, drums on the axle for providing substantially continuous traction transversely of the truck, solid tires on the drums, the tires on the outer ends of the drums being of greater diameter than those adjacent the inner ends thereof, means for differentially driving the drums on opposite sides of the transverse center of the truck and torque arms extending forwardly from said axle to said frame.

2. A combined truck and roller including a truck frame, and a wheel mount for said frame comprising an axle, springs on the axle supporting the frame, drums on the axle for providing substantially continuous traction transversely of the truck, solid tires on the drums, the tires on the outer ends of the drums being of greater diameter than those adjacent the inner ends thereof, means for differentially driving the drums on opposite sides of the transverse center of the truck and torque arms extending forwardly from said axle to said frame.

3. A combined truck and roller including a truck frame, and a wheel mount for said frame comprising an axle, drums on the axle for providing substantially continuous traction transversely of the truck, solid tires on the drums, the tires on the outer ends of the drums being of greater diameter than those adjacent the inner ends thereof, means for differentially driving the drums on opposite sides of the transverse center of the truck and torque arms extending forwardly from said axle to said frame.

4. A combined truck and roller including a truck frame, and a wheel mount for said frame comprising drums providing substantially continuous traction transversely of the truck, solid tires on the drums, the tires on the outer ends of the drums being of greater diameter than those adjacent the inner ends thereof, and means for differentially driving the drums on opposite sides of the transverse center of the truck.

5. A combined truck and roller including a truck frame, and a wheel mount for said frame comprising drums providing substantially continuous traction transversely of the truck and solid tires on the drums, the tires on the outer ends of the drums being of greater diameter than those adjacent the inner ends thereof.

6. A motor vehicle of the character described including a chassis widened at its rear portion which portion is adapted to receive and support a load, springs at the sides of said rear portion of the chassis, a pair of rotatable drums associated with said springs, the outer edges of the drums being adjacent to said springs and the inner edges of said drums being adjacent to each other, said drums being located within the limits of and under the rear portion of said chassis, the width of said rear portion permitting the use of wide drums within the limits of the rear portion of the chassis to thereby provide substantially a continuous traction surface extending transversely under the rear portion of said chassis, said drums being provided with resilient tread surfaces and means for differentially driving said drums, whereby said vehicle may be driven at normal truck speeds over hard improved roads and also may be driven over soft surfaces with a rolling action thereon and without forming ruts in said soft surfaces.

7. A motor vehicle of the character described including a chassis adapted to support a load, springs associated with the side members of the chassis, a pair of rotatable drums associated with said springs the outer edges of said drums being adjacent said springs and the inner edges of said drums being adjacent each other to thereby provide a substantially continuous traction surface extending transversely of the chassis whereby said vehicle may be driven at normal truck speeds over improved roads and also may be driven over soft surfaces with a rolling action thereon and without forming ruts in such soft surfaces, means extending between the drums for differentially driving said drums and means comprising a member supported by the chassis and under the differentially driving means between the drums and adapted to cooperate therewith whereby matter is prevented from working between the drums and obstructing operation of the differentially driving means.

8. A motor vehicle of the character described including a chassis a portion of which is adapted to receive and support a load, springs at the sides of the chassis, a pair of rotatable drums associated with said springs, the outer edges of said drums being adjacent said springs and the inner edges of said drums being adjacent each other, said drums being provided with resilient treads and being located within the limits of the chassis under the load-supporting portion thereof to thereby provide a substantially continuous traction surface extending transversely under the chassis, there being clearance between the inner edges of said drums causing a gap in said traction surface centrally of the vehicle, said gap being substantially less in width than the width of either of said drums, and means for differentially driving said drums, whereby said vehicle may be driven at normal truck speeds over improved roads and also may be driven over soft surfaces with a rolling action thereon and without rutting such soft surfaces.

GEORGE I. WORLEY.